United States Patent
Thenard et al.

(10) Patent No.: US 11,846,566 B2
(45) Date of Patent: Dec. 19, 2023

(54) SYSTEM AND METHOD FOR DETECTING A POSSIBLE LOSS OF INTEGRITY OF A FLEXIBLE BAG FOR BIOPHARMACEUTICAL PRODUCT

(71) Applicant: SARTORIUS STEDIM FMT SAS, Aubagne (FR)

(72) Inventors: Laurent Thenard, Plan d'Aups Sainte Baume (FR); Marc Hogreve, Adelebsen (DE); Tomasz Urbaniak, Göttingen (DE); Mandip Nachhattar, Bobigny (FR); Delphine Philippeau, Marseilles (FR); Bastien Cattaux, Aubagne (FR)

(73) Assignee: SARTORIUS STEDIM FMT SAS, Aubagne (FR)

( * ) Notice: Subject to any disclaimer, the term of this patent is extended or adjusted under 35 U.S.C. 154(b) by 374 days.

(21) Appl. No.: 17/424,959

(22) PCT Filed: Jan. 28, 2020

(86) PCT No.: PCT/EP2020/052067
§ 371 (c)(1),
(2) Date: Jul. 22, 2021

(87) PCT Pub. No.: WO2020/157080
PCT Pub. Date: Aug. 6, 2020

(65) Prior Publication Data
US 2022/0090980 A1 Mar. 24, 2022

(30) Foreign Application Priority Data
Feb. 1, 2019 (EP) .................................. 19155146

(51) Int. Cl.
*G01M 3/20* (2006.01)
*G01M 3/32* (2006.01)

(52) U.S. Cl.
CPC .......... *G01M 3/202* (2013.01); *G01M 3/3281* (2013.01)

(58) Field of Classification Search
CPC .... G01M 3/202; G01M 3/3281; G01M 3/227; G01M 3/00
See application file for complete search history.

(56) References Cited

U.S. PATENT DOCUMENTS 8,910,509 B2  12/2014  Terentiev et al.
2010/0326172 A1*  12/2010  Voute ................. G01M 3/3218
73/40.7

(Continued)

FOREIGN PATENT DOCUMENTS

AT  519682 A1  9/2018
EP  2238425 B1  6/2011

OTHER PUBLICATIONS

International Preliminary Report on Patentability dated Jul. 27, 2021 for International Application No. PCT/EP2020/052067.

(Continued)

*Primary Examiner* — Suman K Nath
(74) *Attorney, Agent, or Firm* — HESLIN ROTHENBERG FARLEY AND MESITI PC; Nicholas Mesiti (57) ABSTRACT

Integrity of a flexible bag is verified by a testing system, using helium to detect existence of a possible hole. The flexible bag is preliminary placed in vacuum chamber of a fluid-tightly isolated enclosure. After connecting a port of the bag to a helium feeding pipe, vacuum suction is performed to obtain vacuum outside the bag in the enclosure. Then, a first amount of helium is diffused in the internal volume of the enclosure through a gas permeable wall, to increase helium partial pressure outside the flexible bag. After, in a test phase while said vacuum suction is still performed, the bag is filled with a second amount of helium.

(Continued)

A detector detects information representative of helium partial pressure in the internal volume, to allow detection of helium escaping from the bag, by analysis of a helium partial pressure drop.

20 Claims, 4 Drawing Sheets

(56) References Cited

U.S. PATENT DOCUMENTS

| | | |
|---|---|---|
| 2014/0083170 A1 | 3/2014 | Pavlik |
| 2014/0165707 A1 | 6/2014 | Dahlberg et al. |
| 2016/0161361 A1* | 6/2016 | Pavlik .................. G01M 3/3263 73/49.3 |
| 2018/0087997 A1* | 3/2018 | Thenard .................... A61J 1/18 |

OTHER PUBLICATIONS

International Search Report and Written Opinion of the International Searching Authority for International Application No. PCT/EP2020/052067 dated Apr. 23, 2020.

* cited by examiner

SYSTEM AND METHOD FOR DETECTING A POSSIBLE LOSS OF INTEGRITY OF A FLEXIBLE BAG FOR BIOPHARMACEUTICAL PRODUCT

CROSS REFERENCE TO RELATED APPLICATIONS

This application is a national stage filing under section 371 of International Application No. PCT/EP2020/052067, filed on Jan. 28, 2020, published on Apr. 6, 2020 as WO 2020/157080 A1 which claims priority to European Patent Application No. 19155146.4, filed on Feb. 1, 2019. The entire disclosures of each application are hereby incorporated herein by reference.

FIELD OF THE INVENTION

The invention relates to systems and methods for detecting a possible loss of integrity of a flexible packaging, for instance a flexible bag intended for receiving a biopharmaceutical fluid.

The term "biopharmaceutical fluid" is understood to mean a product resulting from biotechnology (culture media, cell cultures, buffer solutions, artificial nutrition liquids, blood products and derivatives of blood products) or a pharmaceutical product or more generally a product intended for use in the medical field. Such a product is in liquid, paste, or possibly powder form. The invention also applies to other products subject to similar requirements concerning their packaging. Such products are typically of high added value and it is important to ensure integrity of packaging where such products are contained, particularly the absence of any contamination.

BACKGROUND OF THE INVENTION

For storage and transport purposes, it is customary to place such biopharmaceutical fluids in bags having a wall made of plastic that is flexible, closed, and sterile. It is essential that such bags be fluidtight when they receive biopharmaceutical fluid prior to use or during use of the biopharmaceutical fluid, or at least have a satisfactory level of fluidtightness, so that their possible content is preserved from any deterioration originating externally to the bag, such as contamination. It is therefore necessary to be able to easily detect any loss of integrity of the bag before, during, or after use.

Various methods are currently known for verifying the integrity of a bag suitable for containing a biopharmaceutical fluid. A first known method consists of a physical test to determine if the wall of the bag has a leak or hole. Patent EP 2,238,425 describes a method in which the pressure inside an empty and sterile bag is increased between two plates which limit its expansion. A porous material is placed between the wall of the bag and each plate to prevent the contact of the wall and the expansion-limiting plates from concealing any leaks. The bag is inflated and then the variation of the pressure inside the bag (in a state where the bag is sandwiched/restrained between the two plates) is measured. A pressure drop inside the bag is analyzed. If there is bag leakage, in such a restrained state, the measured pressure falls over time below a given threshold, which allows concluding a loss of integrity.

Patent U.S. 2014/0165707 discloses another method for testing the integrity of a bag. The bag is placed in a compartment and a structured permeable reception layer is placed between the bag and the compartment. The bag is then connected to a source of filling fluid in order to generate a predetermined positive pressure therein. Then the pressure variation in the bag is analyzed to determine whether it is fluidtight and therefore intact. Similarly, also known are patents U.S. Pat. No. 8,910,509 or U.S. 2014/0083170 which describe a portable device for verifying the integrity of a bag wherein the bag is filled with air, preferably sterile, before measuring the pressure therein in order to detect any loss of integrity.

There are also other known methods for verifying integrity using an inert tracer gas. For example, an integrity test using Helium as gas tracer, involves placing an entire bag in a fluid-tight enclosure and then creating a vacuum in the enclosure once it is hermetically closed around the bag. A specific amount of helium (He) is then introduced into the bag. If there is bag leakage, a mass spectrometer detects the presence of helium outside the bag in the enclosure volume.

These physical test methods are suitable for testing integrity of flexible container or bag, provided that it can prove absence of leak path down to a size as from which no microbiological ingress is possible. The most sensitive method, known at that time and suitable for flexible containers is the gas tracer method.

Current gas tracer measuring devices (Mass spectrometers) are able to detect low partial pressures representative of micro-leaks far below 2 µm. However, the detection of leak size below 2 µm encounters other limitations. In order to have a sufficient signal-to-noise ratio, a 2 µm leak size already requires working with a level of residual He in vacuum chamber below the natural concentration/partial pressure of He in air at 1000 mbar ($5 \cdot 10^{-3}$ mbar). When performing the test practically, residual He in vacuum chamber creates a background noise that hides the leak to be detected.

In the case of flexible plastic containers, the measurement of conforming product is affected by several sources of noise, which increase signal amplitude (one of them being natural He concentration/partial pressure) so that the leak rate cannot be easily identified (the signal representing rate measured in case of a good bag that should pass the test can be similar to a kind of signal representing defective products).

The noise may be caused by various conditions, depending on humidity levels in the enclosure, flexibility and/or physicochemical state of the bag. Despite gas barrier films that are typically present in the flexible bag or similar device under test, permeation of helium through plastic film creates a leak rate even for tight products.

There is a need for a method that provides a very high level of sensitivity (down to $10^{-8}$ mbar·L/sec), for obtaining quantifiable and reliable results, and the possibility to partly or fully automate the process, integrating it directly into the manufacturing line too if required.

Current physical methods are ineffective for detecting microleaks in the bag, for example holes smaller than two microns in diameter. In addition, detection of a leak due to a hole smaller than 2 microns is difficult to detect because the leak rate is often too small to distinguish from the background leak rate or noise inherent to the bag (permeation of helium cannot be prevented, even when using an oxygen barrier layer such as EVOH). However, it is known that some microorganisms can pass through a hole smaller than this size, in particular through a hole of submicrometric size under specific conditions such as during immersion bacteriological challenge test for example. The use of the physical test methods described above therefore does not ensure the absence of microbial entry into the bag under such specific conditions.

There is therefore a need, in the specific field of the invention, for efficiently testing a bag intended to be filled with biopharmaceutical fluid, while detecting micrometric and submicrometric holes as small as possible when testing the integrity of such bag before its use, simply and with the same level of reliability, or even with a higher level of reliability, than the methods currently known or used.

OBJECTS AND SUMMARY OF THE INVENTION

For improving situation, embodiments of the invention provide a testing system for verifying the integrity of a flexible bag, using a gas tracer, comprising:
- an enclosure delimiting a chamber (vacuum chamber) in which an internal volume is fluid-tightly isolated from outside of the enclosure in an operating configuration of the enclosure;
- a first helium supplying device provided with a feeding pipe for filling the flexible bag at a filling step with helium, via an outlet of the feeding pipe when the flexible bag is placed in the chamber so as to be surrounded by the internal volume;
- a vacuum suction assembly for performing vacuum suction and extracting gas from the internal volume outside the flexible bag, in a suction mode;
- at least one pressure measurement member for detecting helium partial pressure in a detection area of the internal volume, the detection area communicating with a suction inlet of the vacuum suction assembly;
- at least one source of pressurized helium adapted to and intended to be introduced inside the flexible bag;

the testing system further comprising:
- a second helium supplying device for adding helium (for instance from the at least one source of pressurized helium) in the internal volume of the vacuum chamber, outside the flexible bag, the second helium supplying device comprising a feeding member that is:
  distinct from the feeding pipe,
  communicating with a gas source that may be the at least one source of pressurized helium;
- a control unit for controlling the first helium supplying device and the second helium supplying device, and adapted to trigger the second helium supplying device before the first helium supplying device;
- an analysis module using information representative of evolution over time of helium partial pressure detected by the pressure measurement member before and after the filling step, the analysis module being configured to detect a helium leak on the basis of said information.

The information representative of evolution over time of helium partial pressure may be a time derivative and/or a leak rate (expressed in mbar·L·s$^{-2}$ or mbar·L·s$^{-1}$, respectively). Such information may be analyzed in view of similar information recorded with an integral (non-defective) test sample.

Typically, the analysis module may be adapted to use information representative of evolution over time of helium partial pressure detected by the pressure measurement member, before and after the filling step, in order to obtain a test result representative of a helium partial pressure drop in the detection area, the analysis module being configured to:
use information representative of helium partial pressure detected by the pressure measurement member after addition of helium by the second helium supplying device, for a period that includes a period subsequent to the filling step, when the vacuum suction assembly is in the suction mode;
subtract a determined background value from raw measurements, after determining the determined background value on the basis of information representative of helium partial pressure detected by the pressure measurement member before the filling step, when the vacuum suction assembly is in the suction mode; and
compare the test result to at least one reference result, so as to determine if the flexible bag filled with helium is considered to have or not to have passed the integrity verification.

Subtracting the determined background value may be performed after adding tracer gas in the internal volume. Assuming Helium is the tracer gas, injection of helium may be a step dependent on value of the first time derivative of Helium partial pressure in the detection area. Injection is typically done after a calculation routine and only if a condition is met (such condition may typically reflect bad context for direct analysis). Indeed, for each test, the analysis module is calculating a first time derivative of the partial pressure of Helium in the detection area; when partial pressure of Helium measured in the detection area reaches a trigger point (meaning noise is small enough to trigger the measurement phase), it is checked if the first time derivative of partial pressure of Helium is in a predetermined range (between a lower limit and an upper limit). If the "slope" (in leak rate graph) is outside the suitable range (i.e. range not representative of measurements considered as repeatable), Helium injection is performed by the second supplying device. This will allow detecting lower leak rate, due to stabilization effect.

Conversely, if the first time derivative of partial pressure of Helium is inside the predetermined range, there is no need for injection (no need for stabilization effect). Subtracting the determined background value may be performed without such injection and conclusion of the test is obtained in a more conventional manner.

The test result may be representative of the end of the helium partial pressure drop in the detection area. It can thus be determined, at the end of a usual duration (for instance period of about 2.5 seconds) of the partial pressure variation due to the inflation of the bag. If the test result reflects a sufficient decrease in helium partial pressure as such decrease in helium partial pressure is observed when there is no leak in the bag under test.

With such arrangement, the testing system reduces impact of the following limitations:
i) flexibility of the bag or similar container, which artificially creates an increase in the helium rate (leak rate) when measured during its filling with helium (decrease of the internal volume around the inflated bag causing increase in pressure (partial pressure of helium) within the chamber),
ii) variable tracer gas release during test time due to tracer gas desorption from tested material and vacuum chamber walls.

Indeed, injection of helium around the flexible bag before the filling step, while the testing system is in a suction mode, may be advantageous as it has been observed that desorption (from chamber surfaces and surface of the bag material) is performed more homogenously and the background value for helium leak rate which remains inside the vacuum chamber (despite the vacuum) is regulated.

The second supplying device may be considered as a part of a regulating system for regulating amount of helium able to be desorbed present in the inner volume just before the filling step. The inventors have observed that, as the time required for having a low leak rate (typically below a threshold as low or lower than $10^{-8}$ mbar·L/sec) is greater when specifically adding an amount of helium in the internal volume, such time being for example of about 2 or 4 minutes, there is finally less variation due to desorption and/or due to the movement of the bag wall when inflated at the filling step. The measurements are accurate and form repeatable measurements.

It has been advantageously observed that, for a flexible bag of a volume comprised between 50 mL and 50 L, the testing system can efficiently detect a leak with leak sizes below 2 micrometers in the flexible bag. It means that the testing system is also efficient to efficiently detect a leak having a micrometric size or of about 1 or 2 micrometers for bags of larger capacity.

More generally, such testing system increases efficient of the test for pouches having a wide range of capacities, including pouches of larger capacity, for instance from 50 L to 650 L (for example using a specifically sized testing system for high pouch capacity superior to 50 L).

Possibly, the time required for reaching the threshold may be shortened, if leak detection (for a leak of micrometric size) is sufficient to validate/invalidate the bag integrity.

When a subtracting step is performed to subtract a background value determined in the preparation phase (before the filling step), the analysis module can typically use information representative of evolution over time of helium partial pressure detected by the pressure measurement member before the filling step, so as to determine such background value (for instance a leak rate value) to be subtracted to the raw measurements (about the leak rate) as obtained shortly after the filling step.

In some embodiments, specific injection of helium before the filling step, around the bag, could be made through a porous material. The porous material may be chosen to be similar to a background drop rate normally observed due to helium desorption from material of the bags under test.

Optionally, there is an acceptance threshold, which may be lower than $2.00\ 10^{-8}$ mbar·L·s$^{-1}$, in order to determine or not if the bag passes the integrity test.

As helium partial pressure is selectively injected in controlled manner around the flexible bag after an initial suction phase and before reaching a low threshold for the leak rate, the helium background value related to helium which remains inside the vacuum chamber (despite the vacuum) cannot vary with as various profiles as in previous methods. In other words, the testing method is suitable to decrease standard deviation of leak rate measurement after subtracting the background value from raw measurement.

Moreover, the testing system may operate with a very short test time (about 3 to 4 seconds for instance after starting the filling step), to avoid negative effect due to permeation of helium through plastic film of the bag under test. Regulation effect due to the helium injection in the internal volume around the bag prevents the drawback that (within such short test times) the leak rate measurement of conforming flexible containers is randomly affected by the flexibility of the bag (i) and the tracer gas desorption (ii).

Finally at the end of a test, if no detectable increase of the helium leak rate is observed, the flexible bag (which may have a single envelope) is considered conform to prevent a microorganism from traveling from outside to inside the bag. More precisely, the increased accuracy can confirm that there is no hole of greater size than a minimal submicrometric size detectable when regulating the amount of helium present in the inner volume just before the filling step.

More generally, comparison between the test result and the reference result may be performed on the basis of a test result reflecting evolution over time of the helium partial pressure in a time slot comprised between 1 second and 10 seconds after starting the filling step, preferably between 3 seconds and 10 seconds. In such time slot, the effect of permeation is sufficiently low or not significant, which provides a great accuracy of the test. Of course, the steps can be chronologically controlled and addition of the amount of helium may typically be performed at a predetermined moment, before the filling step and with a time interval (between the introduction of the amount of helium for the internal volume and start of the filling step) that is adapted to regulate the bump or pressure drop present in the graph of leak rate in the vacuum chamber. The bump is a short increase of Helium partial pressure because of bag inflation.

Besides, the amount of helium may be injected through a porous material such as thin silicon tube for example, in order to reproduce the background drop rate normally observed due to helium desorption from the bag material (with conditions compatible to observe same desorption phenomenon as after the filling step). This may be of interest to perform a background value subtraction with respect the raw measurements obtained at appropriate period after the filling step. Indeed, even if desorption rate may vary within a range of same bags having exactly same conditioning before the test, such desorption rate is proportional to a given physical constant for a given bag. As a result, when initially determining a pressure drop representative of the physical constant (desorption constant for the bag under test) and having a corresponding background value for same bag, before the filling step, it allows to better distinguish, at the test phase, between deviation effect for the leak rate drop and leak effect.

Optionally, the control unit is configured to control:
  a first valve allowing circulation of helium in the feeding pipe in the filling step; and
  a second valve allowing circulation of helium in the feeding member.

According to another aspect, the second helium supplying device comprises a valve, preferably a solenoid valve, upstream from the feeding member the feeding member having a gas permeable wall to limit rate of helium added in the internal volume.

According to one aspect, the second helium supplying device further comprises an additional valve, preferably a solenoid valve, downstream from the feeding member. Such additional valve, which may enables communication between a regulation chamber or similar compartment with the vacuum chamber, is of interest so as not to lengthen cycle when not needed.

In various embodiments of the invention, one and/or the other of the following particulars may possibly also be employed, separately or in combination:
  the second helium supplying device for adding helium in the internal volume is deprived from any mechanical connector for connection with the flexible bag (the second helium supplying device being without any opening to communicate with the internal volume of the chamber, while the first helium supplying device comprises a connector delimiting the feeding pipe outlet and forming a free end of the feeding member in a disconnected state.

the port is typically a port that connects the flexible bag to the pressurization system including the first helium supplying device, using the feeding pipe.

the gas permeable wall (included in the feeding member) comprises a microporous and/or mesoporous membrane of silicone rubber or glass.

the feeding member comprises a tube made of silicone adapted to supply helium by diffusion through a silicone wall of the tube.

the at least one source of pressurized helium is a helium source including a single tank outside the internal volume for containing all helium to be injected in the chamber, the single tank being operatively coupled to the first helium supplying device and to the second helium supplying device.

a source of helium, preferably pressurized helium, extends adjacent the bag and/or is embedded as a part of the bag (actuation of a valve, associated to such embedded source of helium, may be optionally performed by remote control means).

the testing system comprises two plates that are in a spaced relationship, preferably parallel, and a housing for receiving the flexible bag between the two plates, the plates preferably forming constraining plates for constraining expansion of the flexible bag when filled with helium during filling step.

the two plates are stationary plates.

In various embodiments according to the invention, one or more of the following may possibly be used, separately or in combination:

the bag has an outer envelope/wall delimiting a single internal space of the bag;

the outer wall of the bag comprises a port suitable for being closed or connected in a fluidtight and removable manner to a source of gas or fluid;

the bag is provided with a fill and/or discharge tube, which is located outside the outer envelope/wall.

the bag may include one or more connectors, filters, sensors.

It is also optionally provided a system for verifying the integrity of a bag according to the invention, comprising:

a bag according to the invention, a source of pressurized gas intended to be introduced into the intermediate space of the bag, a member for measuring the pressure of the gas in the intermediate space in order to compare the pressure drop in the intermediate space once inflated, relative to a predefined pressure drop threshold, and two fixed expansion-limiting plates, spaced apart from and facing one another, suitable for not obstructing any leak in the wall of the second envelope placed against them.

According to a particular, the expansion-limiting plates are respectively covered with linings that are porous to the gas (helium).

The invention also relates to a test method using tracer gas for verifying the integrity of a flexible bag in order to detect the existence of a possible hole, wherein the test method comprises:

in a preparation phase:

providing a testing system comprising an enclosure that delimits a vacuum chamber adapted to be fluidtightly isolated from outside of the enclosure in an operating configuration of the enclosure;

providing an injection device suitable for delivery of a tracer gas in the vacuum chamber, the tracer gas being preferably helium;

placing the flexible bag in the vacuum chamber and connecting a port of the bag to a feeding pipe in communication with a tracer gas source, the tracer gas being typically helium;

performing vacuum suction, in order to obtain vacuum outside the flexible bag in an internal volume of the vacuum chamber;

performing a gas tracer injection by supplying, by the injection device, an amount of the tracer gas (typically helium) in the internal volume outside the flexible bag;

in a test phase, while said vacuum suction is still performed:

filling the flexible bag with helium at a filling step;

detecting information representative of helium partial pressure outside the flexible bag in the internal volume, to allow detection of helium escaping from the flexible bag, by using at least one pressure measurement member;

then, in a subsequent step, comparing a test result representative of a helium partial pressure drop in the internal volume outside the flexible bag, which is obtained using the at least one pressure measurement member, to at least one reference result, so as to determine if the flexible bag is considered to have or not to have passed the integrity verification.

With such method, sensitivity is good due to more stable conditions. All the steps can be performed in a same measuring cycle (for instance with a substantially constant suction performed by at least one vacuum pump or similar vacuum means). Accordingly, 1 μm leak detection limit (and submicrometer leak detection) is available in efficient manner, for instance to insure/verify the integrity against microorganisms under immersion BCT (Bacterial Challenge Testing) conditions.

Unlike previous methods with analysis of a pressure drop, the detection method is not at risk on larger container (such as 3D bags, typically having 10-L, 50-L or larger capacity), due to decrease of standard deviation of Leak rate measurement after subtracting the background value from raw measurement.

Such method may be used to calculate a leak rate based on determination of helium partial pressure in the test chamber (typically by using a mass spectrometer) and then compare such calculated leak rate to an acceptance criteria (threshold value), in order to determine whether the tested flexible bag passes or fails the test.

In order that the measurement is sensitive enough, subtracting the background makes the test more efficient and reliable.

Additionally, the second supplying device may be configured to slowly add helium and thus mimic/reproduce the background drop rate normally observed due to helium desorption from plastic material of the bag under test.

A silicone tube can be placed in tubing before a solenoid valve, so as not to lengthen cycle when not needed.

According to a particular embodiment, in the test phase:

comparison between the test result and the reference result is performed based on helium partial pressure measured in a time slot comprised between 3 seconds and 10 seconds after starting the filling step, preferably in a time slot comprised between 3 and 6 seconds;

and/or comparison between the test result and the reference result is performed by taking into account a pressure drop background value obtained after injection of the determined gas tracer in the internal volume outside the flexible bag and before the filling step, the test result being determined on the basis of raw measurements obtained in a time slot comprised between 3 seconds and 10 seconds after starting the filling step.

The tracer gas is helium and the test method comprises, in the preparation phase:

performing vacuum suction inside the flexible bag to empty an internal space of the flexible bag;

measuring the partial pressure of Helium in a detection area of the internal volume (outside the bag);

calculating a first time derivative of the partial pressure of Helium in the detection area (using a sensor, mass spectrometer or similar pressure measurement member);

wherein, when partial pressure of Helium measured in the detection area reaches a trigger point (i.e. such pressure has sufficiently decreased (high vacuum), meaning noise is small enough to trigger the measurement phase), it is checked if the first time derivative of partial pressure of Helium is in a predetermined range, between a lower limit and an upper limit, and only if the first time derivative of partial pressure of Helium is outside the predetermined range, the Helium injection is performed by the injection device in the chamber.

According to a particular embodiment, in the preparation phase, the amount of helium is supplied in the internal volume outside the flexible bag after a helium partial pressure has been measured in the internal volume as low as or below a predetermined threshold. Such threshold is below $5 \cdot 10^{-3}$ mbar (typically $4 \cdot 10^{-5}$ mbar or below), which means that the threshold typically corresponds to helium pressure lower than helium partial pressure in ambient air.

It means that before the test phase (i.e. before measures are used for the helium integrity test), part of helium (including helium recently injected in the supplying step) is evacuated by suction from the chamber of the enclosure, where the flexible bag is placed. Optionally, the reference result is or reflects a predefined pressure drop threshold, obtained by calculating a time derivative of a helium leak rate as detected by at least one pressure measurement member in a detection area of the internal volume.

A leak may be detected as helium leaking from the bag would reduce or annihilate the partial pressure drop (pressure quick decrease) that should be normally present when there is no leak.

According to a particular embodiment, the filling step is performed in order to have the flexible bag maintained between two expansion-limiting plates, spaced apart from and facing one another, suitable for not obstructing any leak in the wall of the flexible bag placed against them. This may be of interest to control expansion of the internal space of the bag. A porous layer may be used to form the contact against the outer wall of the bag.

According to a particular embodiment, the flexible bag constitutes or is a part of a device under test intended to receive biopharmaceutical product and is provided with several flexible pipes each connected to a respective port of the device under test, the device under test being placed in the chamber before performing vacuum suction.

Optionally, in the preparation phase, performing vacuum suction implies evacuating gas at different suction areas of the enclosure, in order to obtain vacuum inside the flexible bag and outside the flexible bag in the enclosure.

According to a particular, the amount of helium injected when performing the gas tracer injection in the internal volume outside the flexible bag is a first amount of helium, the flexible bag being filled with a second amount of helium at the filling step, the first amount of helium being inferior or equal to the second amount of helium.

The invention also relates to a system for verifying the integrity of a bag according to the invention, comprising a gas detection member.

In various embodiments of the invention one and/or the other of the following may possibly also be employed, separately or in combination:

the system comprises:
a bag according to the invention,
a source of pressurized gas intended to be introduced into the intermediate space,
a control unit including a gas pressure control and management member; and
the system further comprises an outer container or enclosure adapted and intended for receiving the bag in its entirety.

BRIEF DESCRIPTION OF THE DRAWINGS

The figures of the drawings are now briefly described.

MORE DETAILED DESCRIPTION A detailed description of several embodiments of the invention is provided below, accompanied with examples and with reference to the drawings.

In the various figures, the same references are used to designate identical or similar elements.

Figure 1:
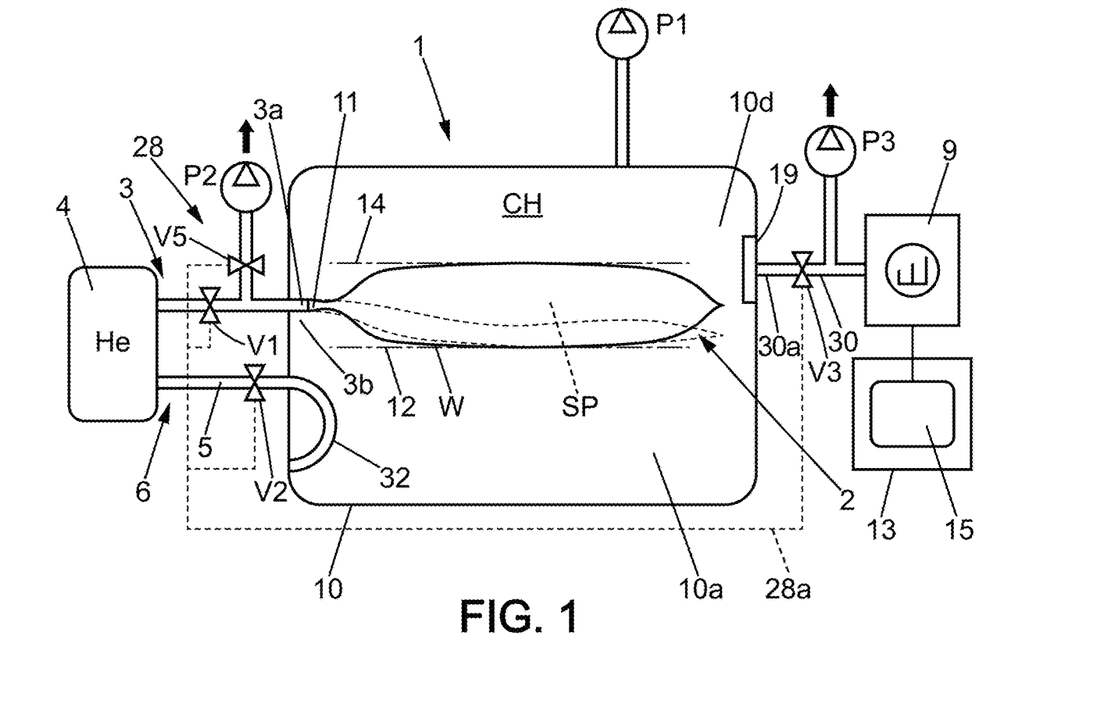
FIG. 1 is a schematic view of a testing system in accordance with an embodiment of the invention.

Referring to FIG. 1, it is shown a testing system 1 for verifying the integrity of a flexible bag 2, the system comprising a an enclosure 10, one or more sources of pressurized helium 4 and a pressure measurement member 9 that is typically suitable to provide measures reflecting partial pressure of helium in a chamber CH delimited by the enclosure 10. In the chamber CH that forms a space airtight closed (and thus isolated from the ambient air). The enclosure 10 may be provided with opposite faces delimiting a receiving compartment for a flexible bag 2. Optionally, two plates 12, 14, for instance two rigid plate members, are provided to delimit the compartment where the bag 2 is located. The bag 2 is typically introduced in the chamber CH, here in the compartment, in a non-inflated state/non-filled state. Only a small amount of air due to the pressure balancing may be initially present in the bag 2 as introduced in the chamber CH. This is advantageous to limit amount of gas to be evacuated. At least one port, here only one port 11 of the bag 2 may provide communication between internal space SP of the bag 2 and the source of pressurized helium 4.

When the enclosure 10 is tightly closed, the outer wall W of the bag 2 may be seen as a partition wall, made of plastic material (typically plastic without any mineral or metal layer), between the internal space SP inside the bag 2 and the internal volume 10*a* around the bag 2 which is fluid-tightly isolated from outside of the enclosure 10.

The enclosure 10 has at least two feeding parts to allow a tracer gas to be introduced in the chamber CH, respectively in the internal space SP and in the internal volume 10*a* outside the bag 2. The wording "outside the flexible bag 2" means that the gas tracer is injected in an area around the outermost wall of the flexible bag; Typically, the outer wall W of the bag 2 is the wall directly inflated when filling the bag with helium and this outer wall W directly separates the internal space SP from the internal volume 10*a*.

Figure 5:
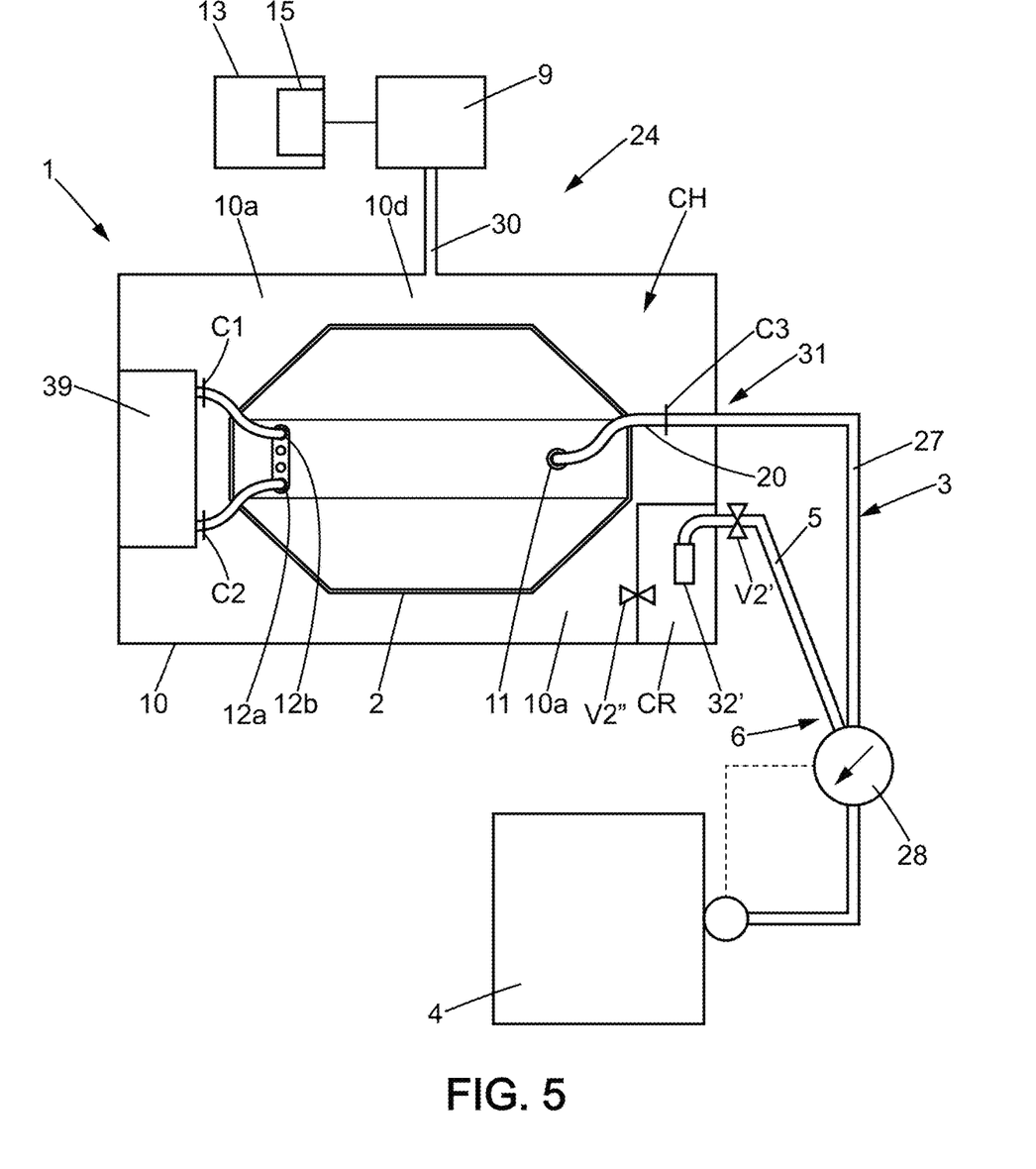
FIG. 5 is a schematic view of another embodiment of a system for verifying the integrity of a bag such as shown in FIG. 2, the system comprising a source of pressurized helium intended to be introduced into the internal space of the bag on the one hand and around the bag on the other hand, a valve assembly and a member being provided for managing and controlling the helium to be injected inside the bag and around the bag.

For instance, as illustrated in FIGS. 1 and 5 in particular, the testing system 1 may be provided with a first helium supplying device 3 having a feeding pipe 3*a* or similar injection line 27 for connecting the source of pressurized helium 4 to a given port 11 of the flexible bag 2.

In the embodiment of FIG. 1, at least one valve V1 is included in the first helium supplying device 3, such valve V1 being arranged between a tank of the source of pressurized helium 4 and the outlet 3*b* for connection with the port 11 of the bag 2. The source of pressurized helium 4 comprises or is a helium source including a single tank (outside the chamber CH) for containing all helium to be injected in the chamber CH, the single tank being operatively coupled to the first helium supplying device 3 and preferably also to a feeding member 5 (pipe or similar duct for instance) of a second helium supplying device 6. In variants, several tanks or separate helium sources may be used.

Figure 4:
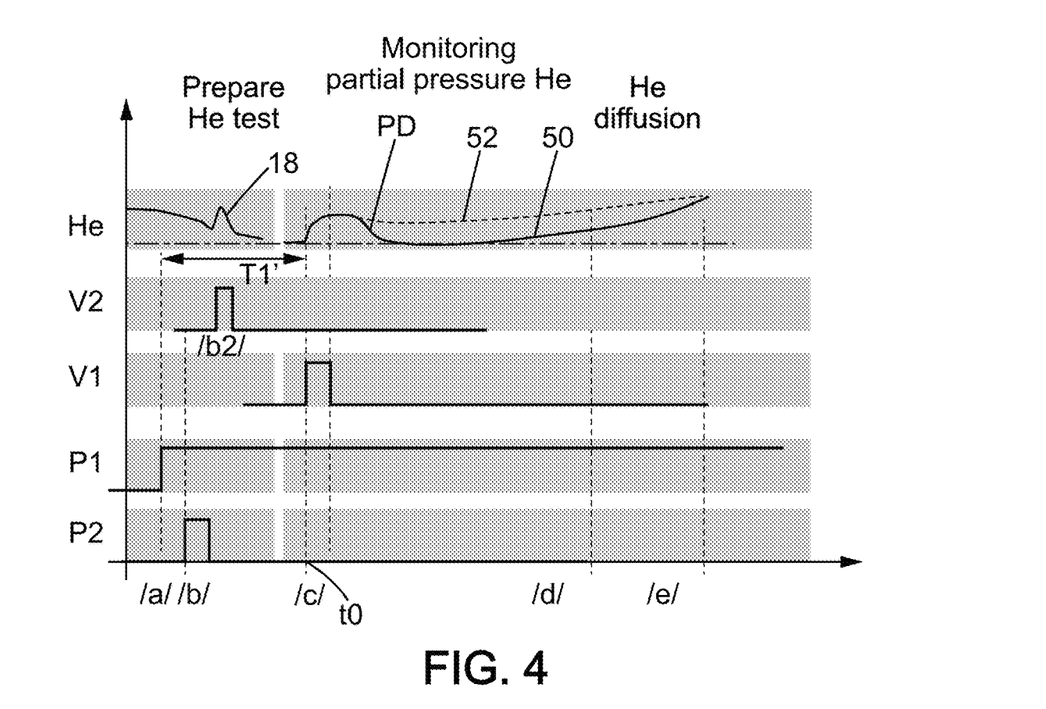
FIG. 4 is a timing chart, similar to FIG. 3, illustrating an operation of the testing system according to an embodiment of this invention, by opening a valve to inject an amount of helium.

The testing system 1 is provided with a leak detector assembly that comprises the pressure measurement member 9, the enclosure 10, a control unit 13 and a control and management assembly 28 coupled to the control unit 13, valves V1, V2, V3, V5 to be actuated during a measuring cycle by the control and management assembly 28 and/or the control unit 13. The control unit 13 may be provided with an analysis module 15 using information representative of helium partial pressure detected by the pressure measurement member 9 during a measuring cycle such as illustrated in FIG. 4.

A mass spectrometer is typically provided to form the pressure measurement member 9, such mass spectrometer having or being in communication with a detection area 10*d* where pressure drop PD (drop due to quick variation of helium partial pressure in the chamber CH around the bag 2 that has just been inflated) can be measured and analyzed. A pressure drop PD is systematically created after starting filling the bag 2 with helium as a difference in pressure is obtained between the internal space SP of the bag 2 and the internal volume 10*a* around the bag 2 (with increase in concentration in the internal volume 10*a*).

The mass spectrometer is suitable for tracer gas detection (helium detection), in particular if a vacuum is created in the enclosure 10 prior to the phase of testing the bag 2 with the system 1.

In embodiments of FIGS. 1 and 5, the testing system 1 is used to detect the integrity of the outer wall W of the bag 2, such wall W extending entirely within the limits of the chamber, typically between the two plates 12, 14 present inside the chamber CH.

The enclosure 10 of the testing system 1 is here an outer container in which the bag 1 according to the invention can be placed. The outer container larger than the bag 2 (or symmetrically the bag 2 is smaller than such outer container), so that the bag 2 in inflated state remains inside the chamber CH. Optionally, the enclosure 10 may comprise a lining porous to the gas inside the chamber 10, such lining being a contact part in contact with the bag 2 at least when the bag is in inflated state after a filling step where the bag 2 is filled with helium (inert tracer gas). The lining, against which the bag 2 is placed, does not block any leakage of the outer wall W when the bag 2 under test is placed inside the chamber CH.

The outer container forming the enclosure 10 may in particular consist in a box or a rigid or semi-rigid fluid tight shell. More particularly, in one configuration, the enclosure has a parallelepiped shape. The enclosure 10 may comprise an opening for introducing the bag 1, which can be selectively open or closed. To this end, the outer container of the enclosure 10 may comprise for example a removable cover or door provided with members for gripping and handling. Where appropriate, gripping members are provided for quickly locking the cover in the closed position, capping the opening.

Referring to FIG. 1, the testing system 1 comprises a source 4 of pressurized gas (here pressurized helium in this non-limiting embodiment) and a line including the feeding pipe 3*a* for the injection of pressurized helium, able to be associated in fluid communication or being associated in fluid communication with the outlet of the port 11 of the bag 1.

The first helium supplying device 3 is connected to the enclosure 10 at a location distinct/separate from the port 30 or pipe connecting the pressure measurement member 9 to the chamber CH.

An amount of helium is intended to be inserted into the internal space SP of the bag 2 via the port 11 and appropriate connecting elements of the first helium supplying device 3. It is understood that helium (or equivalent inert gas) is a gas neutral and non-toxic to the biopharmaceutical fluid that can form content of the bag 2, in order not to contaminate the biopharmaceutical fluid.

While FIG. 1 shows the outer wall W under the form of a single wall of the bag, the bag 2 may be provide, in variants, with one or more external parts partly covering the outer wall W and in spaced relationship relative to the outer wall W.

Figure 2:
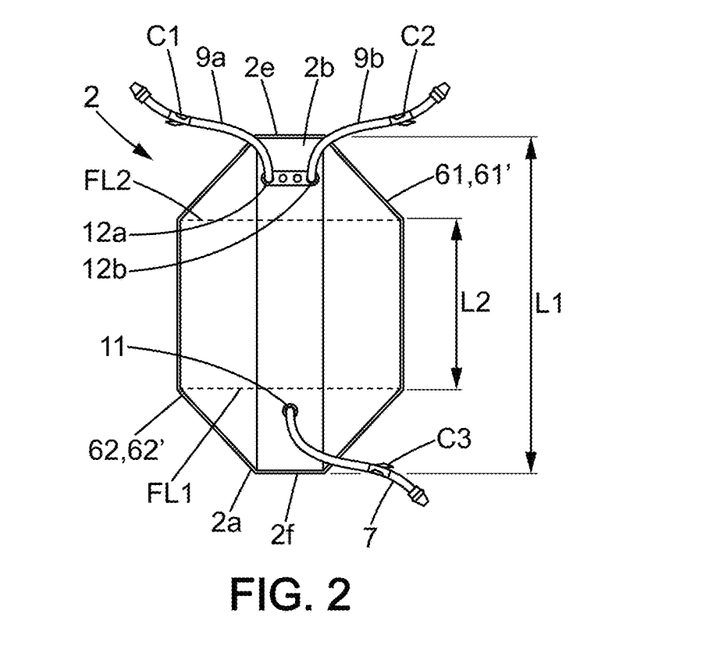
FIG. 2 is a top view of an exemplary flexible bag that may form a device under test when performing a test method in accordance to the invention.

As illustrated in FIG. 2, the flexible bag 2 in the folded state has two opposing flat faces, with ports 11 and 12*a*-12 being provided on one of these main faces. The two other faces are folded. The bag portions forming these two other faces are sheets of plastic material, which have the shape of flattened bellows (forming tow opposite gussets) and are inserted between the two initially flat sheets forming the opposing faces. The flat state of the flexible bag 2, as obtained immediately after manufacture, is allowed by the superposition of weld seams 61, 61' and 62, 62'. The free edges 2*e* and 2*f* may be rectilinear edges of the bag 2.

Thanks to a typically hexagonal shape of the opposite faces, the bag 2 may easily reach a parallelepiped shape, by expansion of the gussets and folding along the parallel folding lines FL1, FL2 (with L1 being a distance separating the folding lines FL1, FL2 of a same plastic sheet of the bag 2.

This a non-limiting example of 3D flexible pouch or bag 2. The parallel folding lines FL1, FL2, as obtained in inflated/filled state of the bag 2, are predetermined folding lines formed in the main opposite face of the bag 2 (unlike 2D containers).

Such a bag 2 comprises a bottom wall, a top wall, and a flexible side wall which may be in two extreme states—folded flat, or unfolded and deployed—and be reshaped to change from one to the other of these states or be in any intermediate state. When the flexible bag 2 is filled with biopharmaceutical fluid or filled with gas during a test, it is inflated to a greater or lesser degree. It may form a parallelepiped container. While its bottom wall can rest on the inner face of the base of the enclosure 10 or inner face of a constraining plate 12, 14, its side wall is deployed toward the inner face of the side wall of the enclosure.

The flexible bag 2 is here illustrated as having a hexagonal shape in a non-filled state. Each of the sheets forming the bag 2 may have a length L1 which is greater than a longer side L2 of hexagonal shape the flexible bag 2 in the non-inflated/non-filled state (shape clearly visible in FIG. 2).

It is understood that the length L1 of the flexible bag 2 in its initial state before filling, when measured from the lower end 2a to the upper end 2b, is greater than the height of the flexible bag or pouch 2 in its deployed and filled state (this height being substantially equal to length L2, for instance).

The flexible pouch or bag 2 has here one or more inlet or filling or supply openings, in particular in the form of ports 12a-12b (which may form upper ports), in particular in the top wall, and one or more outlet or discharge or evacuation openings, in particular in the bottom wall, in particular in the form of ports 11. The outer wall W of the bag 2 thus may be provided with at least two orifices, in other words two passages, at least one for filling with a biopharmaceutical fluid, and at least one orifice for discharging the biopharmaceutical fluid.

Preferably, any line 7, 9a, 9b connected to the bag 2, here to a same face of the bag, 2b is referred to as a flexible supply line. Furthermore, each of flexible lines 7 and 9a-9b is preferably equipped with a clamping member such as clamp C1, C2, C3.

The inlet openings are adapted to be closed when necessary and/or a clamp member C1-C2 is used to close off access to the interior of the flexible pouch 2. Similarly, the outlet opening or openings are adapted to be open when necessary and/or a clamp member C3 is used to allow passage through the flexible line 7. The fill orifice and discharge orifice of the wall W are respectively associated by fluidtight connections with fill tubes. For example, the fill orifices at the ports 12a-12b are associated to the flexible line 9a and the flexible line 9b (typically with clamps C1 and C2 shifted away from the ports 12a-12b).

While the illustrated embodiment shows use of port 11 for filling with helium, any one of the fill orifices and outlet opening may be used for filling with helium an internal space SP of the flexible bag 2, provided that it is connected to a source 4 of pressurized helium by a corresponding flexible line, while the other flexible lines are in a closed state. In FIG. 5, the port 11 where helium is injected in the internal space of the flexible bag 2 may be an outlet orifice. The other lines may be attached, using a fixture device 39, while clamps (here clamps C1, C2) prevent any escape of helium present in the bag 2 into the chamber CH, in the internal volume 10a around the bag 2.

Now referring to FIG. 5, it can be seen that clamps C1, C2, C3 may be used to hermetically close the flexible bag 2 when placed in the enclosure 10. In variants, the flexible lines 7, 9a, 9b of the bag 2 may be each linked to a vacuum circuit, for instance a same vacuum circuit.

In some variants, the bag 2 comprises an envelope that may be 2D, in which two wall members are directly joined to one another. The bag 2 may also have an envelope of the 3D type, in other words three-dimensional. The wall W then typically include the two parts that form the main faces, such two parts being fixedly and sealingly connected to two side gussets by four longitudinal fluidtight weld seams 61, 61' and 62, 62' (and two transverse weld seams).

Figure 3:
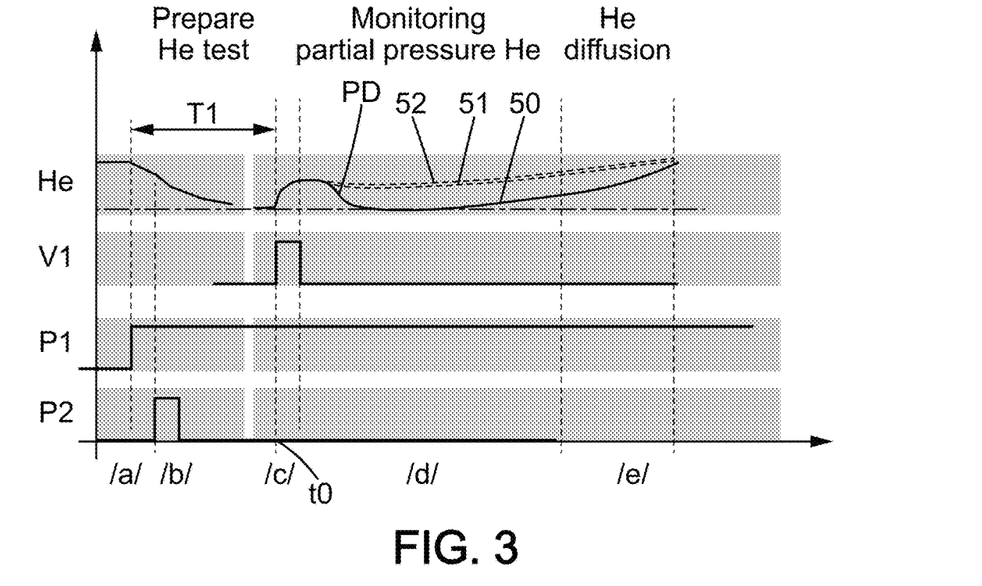
FIG. 3 is a timing chart illustrating an operation of a testing system, showing there is limitation in efficiently identifying a leak when the leak size is as low as or slightly smaller than 2 micrometers.

As illustrated in FIGS. 3-4, it can be seen that suction has to be performed, in order to decrease pressure in the chamber CH. When remaining pressure is sufficiently low, the monitoring phase (test phase) of the measuring cycle may be performed. The test phase is here starting at t0. At the beginning of the measuring cycle, the testing system 1 may be similar to known systems in that it is required to reach a low pressure threshold, after a waiting period T1. The valve V1 is actuated at t0 to obtain an inflated bag 2 adapted to be tested.

The control and management assembly 28 may for example include a pressure controller for the pressurized inflation gas in the feeding pipe 3, ordering the injection of gas (helium) when desired (here at t0) and controlling the injection at the desired pressure. Such an assembly 28 may be provided with a pressure gauge, an adjustable valve, and/or a control line between them. A control line 28a may link the control and management assembly 28 to the control unit 13, in order to coordinate steps during a measuring cycle. The assembly 28 may form a part of the control unit 13.

In accordance with preferred embodiments, as shown in FIG. 4, the valve V2 for operation of the second helium supplying device 6, allowing circulation of helium toward the internal volume 10a, may be temporarily open before opening the valve V1 for the filling of the bag 2. Unlike a conventional preparing phase (such as shown in FIG. 3) without any helium added around the bag 2, a specific injection 18 is performed at the time period of performing suction, here by use of the vacuum pump P1, while the bag 2 is not filled with helium. Due to such injection 18, there is an increase of the partial pressure of helium in the internal volume 10a.

Figure 6:
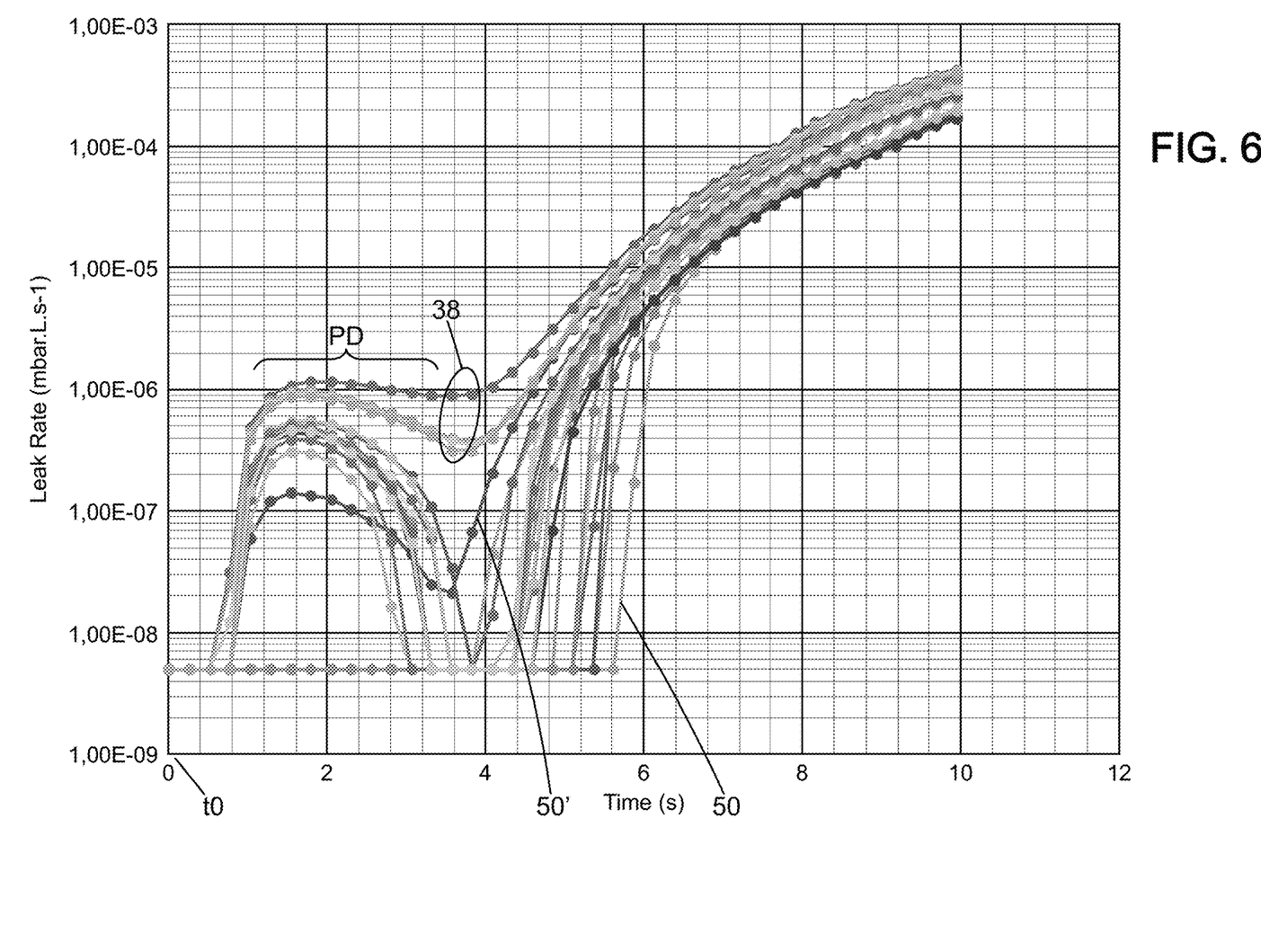
FIG. 6 depicts Leak Rate versus time waveforms obtained using same conventional leak rate test cycle, with bags that are all conform (without any leak in view of subsequent test/investigations), and especially illustrate four situations where deviation of Leak rate measurement prevents efficiently discriminating between intact bags and bags having a leak of micrometric or submicrometric size.

Referring to FIGS. 3 and 6, when comparing several leak rate curves for conform products under test, it is apparent that after t0, the leak rate as measured by a pressure measurement member 9 can deviate (not forming expected pressure drop PD with significant decrease of the leak rate), so that a curve 51 for a perfectly intact bag 2 may be similar to a curve 52 reflecting situation where the bag 2 has a hole of about 1 or 2 micrometers size, causing a leak.

Using the specific injection 18 as illustrated in FIG. 4, such deviation is greatly minimized and/or test conclusion for conform products is easier.

As, the injection 18 offers a view of the profile of the background value (as it cause a reference drop profile), it is easy to extract a background value that is relevant for improving the test phase performed after the beginning of the filling step. The end of the drop (reference drop profile over time) in the preparing phase may reflect the background value to be considered. As a result, the problematic case reflected by curve 51 in FIG. 3 can optionally be solved by subtracting the background value from raw measurements obtained on the basis of the drop (for example in view of the level of the leak rate at the end of the reference drop profile) caused by injection 18.

Now referring to FIG. 1, it is understood that the specific injection 18 is allowed before the gas, here helium, is flowing in the feeding pipe 3a of the first supplying device 3. The vacuum pump P1 participates to evacuate gas from the chamber CH. The pump P1 functions as or is part of a vacuum suction assembly for performing vacuum suction and extracting gas from the internal volume 10a outside the flexible bag 2, in a suction mode.

A vacuum pump P2 may be associated to the first supplying device 3. The vacuum pump P2 communicates with the feeding pipe 3a, for instance via a lateral passage downstream relative to position of the valve V1. This vacuum pump P2 is not used during the test phase of the measuring cycle (the valve V5 being closed just at t0 and just after such closing, the valve V1 is open). The vacuum pump P2 is of interest to evacuate air from the flexible bag 2 to then have a reproducible test gas amount or concentration (He) inside the bag 2; otherwise, Helium from source 4 will mix with the rest of the air in the bag 2. In a preferred option, as illustrated in FIG. 4, the pump P2 may operate shortly in the preparing phase after starting suction by the main vacuum pump P1, in order to prevent too great inflation of the bag 2. The suction by the pump P2 is stopped well before t0, by closing the associated valve V5. The vacuum pump P2 may optionally be used for suction before a measuring cycle and possibly after the measuring cycle.

The pressure measurement member 9 comprises one or more mass spectrometers, typically a mass spectrometer suitable to detect helium concentration (partial pressure) in the detection area 10d of the internal volume 10a. Here, the detection area 10d directly communicates with a suction inlet of the vacuum suction assembly, which is inlet of vacuum pump P1 for instance in embodiment illustrated in FIG. 1.

At least one vacuum pump P3 may be associated to the mass spectrometer. Another pump (secondary pump, not shown) may be embedded in the mass spectrometer forming the member 9. The valve V3 may be a conventional valve for such mass spectrometer, which is typically provided with a turbo-pump assembly or similar pump means. The detection assembly, forming or including the pressure measurement member 9, may be chosen amongst some commercially available products, possibly improved to enhance accuracy of measurements.

In a variant, the main vacuum pump P1 may be arranged in a line in direct communication with the duct 30a, downstream the valve V3. The principle of leak detector in such detection assembly can be based on a sector field mass spectrometer. Analyzed entry gasses (in this case Helium) are ionized in vacuum. Ions of helium are accelerated using added voltage and further separated in the magnetic field. For instance, the ion current is, using a special detector (known per se), turned into an electric current. This current is accelerated and displayed on the screen using leak detection units. The measured current is in direct proportion to helium partial pressure and therefore equal to the measured leak.

Embodiments for the second supplying device 6, possibly a second helium supplying device, will be now described in relation with FIGS. 1 and 5.

The second helium supplying device 6 for adding helium in the internal volume 10a, here from the source of pressurized helium 4, comprises the feeding member 5 that is separate from the feeding pipe 3a, and a tube 32 or similar part for diffusion of the helium through a wall having an outer face in the chamber CH in the internal volume 10a or delimiting all or part of an area directly communicating with the internal volume 10a.

The tube 32 is typically made of silicone adapted to supply helium by diffusion through a silicone wall or porous type glass wall of the tube 32. A face, preferably the interior face, of the tube 32 delimits an area communicating with the at least one source of pressurized helium 4 via a pipe of the feeding member 5. The valve V2 may be a solenoid valve controlled by the control unit 13 via the control line 28a. Using a routine in the control unit 13, the valve V2 may be selectively open to cause helium injection 18 that increases helium partial pressure in the internal volume 10a around the bag 2.

In embodiment of FIG. 1, the second helium supplying device 6 comprises at least one valve V2, preferably a solenoid valve, upstream from a diffusing part or tube 32 of the feeding member 5 ("upstream" is to be considered relative to the flow of gas tracer circulating from the gas tracer source toward an interface where the tracer gas reach the internal volume 10a around the bag 2). It is understood that the diffusing part of the feeding member 5 typically has a gas permeable wall to limit rate of helium added in the internal volume 10a.

In the variant of FIG. 5, the second helium supplying device 6 comprises at least one valve V2', preferably a solenoid valve, upstream from the tubing, tube 32' or similar diffusing part of the feeding member 5. The second helium supplying device 6 also comprises an additional valve V2", preferably a solenoid valve, downstream from the feeding member 5. The valve V2" may extend adjacent or within the chamber CH. At the tube 32', the feeding member 5 has a gas permeable wall. Optionally, as in embodiment of FIG. 1, the permeable wall is adapted (with helium porous material) to limit rate of helium added in a regulation chamber CR before being injected in the internal volume 10a. The additional valve V2", which may enables communication between the regulation chamber CR or similar compartment with the vacuum chamber CH, is of interest so as not to lengthen cycle when not needed. As silicone tube or glass tube, which forms the gas permeable wall of the feeding member 5, is placed in tubing before the additional valve V2" while extending in the regulation chamber/compartment CR, so that helium will not be supplied into the vacuum chamber CH in a closed state of the additional valve V2".

In FIG. 5, the control and management assembly 28 may be suitable to control helium circulation in a line 27 of the first helium supplying device 3 and in the second helium supplying device 6. Coordination with the measurements is allowed as the control unit 13 is linked to the control and management assembly 28 in this particular embodiment. Of course, many other options are suitable to form and control the first helium supplying device 3 and the second helium supplying device 6.

The second helium supplying device 6 may be provided with a gas permeable wall that comprises a microporous and/or mesoporous membrane of silicone rubber (or optionally a porous glass member), suitable for diffusing helium toward the internal volume 10a.

The second helium supplying device 6 can be actuated by a command from the control unit 13, depending on a result of a calculation performed at early stage, when reaching a low vacuum. Typically, the first time derivative of Helium partial pressure in the detection area 10d is analyzed. If such slope is too high or too low, measurements will not considered as repeatable. Here, injection of helium by using the second helium supplying device 6, will be done if the slope as analyzed/determined does not reflect appropriate context for repeatable measurements. Such analysis is performed when Helium partial pressure is as low as 4E-5 mbar (see slope on the left in FIGS. 3 and 4 for example).

When partial pressure of Helium measured in the detection area 10*d* reaches a trigger point (meaning noise is small enough to trigger the measurement phase), it is checked if the first time derivative of partial pressure of Helium is in a predetermined range, between a lower limit and an upper limit. Only if the slope as observed on leak rate graphs (such as in FIGS. 3-4) is outside the suitable range, the specific injection 18 (Helium injection) is performed by the second helium supplying device 6. The calculation routine to detect need or not for injection 18 is performed at each test, which is of interest as for some tests, accurate result will be obtained quickly, without the injection 18 and without additional waiting period of decrease in Helium partial pressure.

The following part describes some options for the preparation phase, such options being preferably used only when it has been determined that initial slope is outside the suitable range (situation of FIG. 4).

Referring to FIG. 1, the control unit 13 is configured to trigger the second helium supplying device 6 before the first helium supplying device 3, so that the valve V1 is actuated after the valve V2 during the measuring cycle for a given bag 2 under test. The control unit 13 also triggers pumps, for example vacuum pumps P1 and P2, possibly in a conventional manner. When actuating the pump P1 for suction of gas present in the chamber CH (at step a/), a waiting period T1' is typically required before starting the filling step for inflating the bag 2. Indeed, it is usually necessary to wait for a stabilization period to end before proceeding with the test itself.

During this waiting period T1', as illustrated in FIG. 4, the valve V2 is open when the helium partial pressure is sufficiently low, so that helium injection 18 is performed around the bag 2. This is done well before the filling step (i.e. well before t0) to produce a reference drop.

Then, in a subsequent step, the pressure drop in the intermediate space or internal volume 10*a* is compared, by means of the pressure measurement member 9 coupled to the control unit 13, to a predefined pressure drop threshold. This threshold is for example the value of the pressure drop of a bag 2 undergoing integrity verification and considered to be intact.

However, if the pressure drop PD is detected with a value (at the end of usual duration) that is greater than the threshold, the outer wall W is considered not to have passed the integrity verification (the bag 2 failing the test).

Measurements are optionally made in the preparation phase and used to determine a background value for the reference drop due to the injection 18. Such option may be implemented for a range of bags where pressure deviation cause issues for adequately detect leaks and/or for situations where it is required to systematically find leaks of sub micrometric size that form a passage for some specific bacteria. The background value may be determined at the end of the reference drop (end of the peak), when decrease in helium partial pressure is sufficiently low. Such background value is of interest as it reflects physical conditions of the chamber CH around the bag 2 and the way helium is evacuated with such conditions. Indeed, such situation shows a profile for the helium leak rate when promptly increasing helium partial pressure in the internal volume 10*a*.

The test phase can begin when the level of the helium partial pressure is below a threshold. Possibly, a same or similar threshold, for example $4 \cdot 10^{-5}$ mbar or less may be used by the control unit 13, so as to trigger the second helium supplying device 6 and the first second helium supplying device 3 only after reaching a leak rate as low as or below such threshold, which is a predetermined threshold.

Measurements in the test phase reflect the end of the profile of the pressure drop PD. The analysis module 15 use such measurements (helium partial pressure detected by the pressure measurement member 9) to generate information representative of evolution over time of detected helium partial. The analysis module 15 comprises a comparison routine to detect a helium leak on the basis of such information. A reference result, typically corresponding to a predefined threshold (predefined pressure drop threshold) is also used by the comparison routine.

In some embodiments, the reference result is a predefined pressure drop threshold, obtained by calculating a time derivative of a helium leak rate as detected by the pressure measurement member in the detection area 10*d*. In variants, duration of the pressure drop PD may be taken into account to determine a reference result, to be compared to a test result obtained at same or similar time reflecting the end of the peak/pressure drop.

More generally, it is understood that the analysis module 15 may be configured to:
use information representative of helium partial pressure detected by the pressure measurement member 9 after addition of helium by the second helium supplying device 6, for a period that includes a period subsequent to the filling step, when the suction mode is active; and
compare the test result to at least one reference result, so as to determine if the flexible bag 2 filled with helium is considered to have or not to have passed the integrity verification.

The analysis module 15 may include or may be a part of the control unit 13, which is for instance configured as a computer unit including a Central Processing Unit (CPU), a Random Access Memory (RAM), a Read Only Memory (ROM), a flash memory for storing a back-up data or the like, an input interface, and an output interface. Typically, the control unit 13 is an Electronic Control Unit (ECU) which electrically controls valves V1, V2, V3, V5, for instance by comprising the control and management member 28. The control and management member 28 may be provided with a control line 28*a* enabling actuation and/or transmittal of commands to the valves.

The ROM of the control unit 13 stores a program for operating the computer unit as the control unit 13. When the CPU executes the program stored in the ROM by using the RAM as a working area, the computer unit functions as the control unit 13 of this embodiment. The mass spectrometer or similar pressure measurement member 9 for detecting gas in the enclosure 10 is connected to the input interface of the control unit 13, in order to provide data to the analysis module 15. Various control objects including the valves are connected to the output interface of the control unit 13.

Referring to FIG. 1, the testing system 1 may be a complete system provided with one or more sources 4 of pressurized tracer gas (here helium or SF6), the enclosure 10, and with the following modules:
Helium mass spectrometer leak detector, comprising the mass spectrometer which is made to function as a pressure measurement member 9 and optionally an inlet interface 19 for communication between the chamber CH and the port 30 or pipe for circulating gas toward the pressure measurement member 9, Vacuum system coupled to the enclosure 10 to maintain sufficiently low pressure in the mass spectrometer, Vacuum pumps, including a pump P2 to evacuate the tested flexible bag 2 (typically at step b/ illustrated in FIGS. 3 and 4), another pump P3 to cause circulation of helium toward the mass spectrometer forming the pressure measurement member 9 (when the mass spectrometer is arranged outside the chamber CH as in the embodiment shown in FIG. 1), and possibly a main pump P1 used to evacuate the internal volume 10*a* around the bag 2, Valves V1, V2, V3, V5 which control individual steps of a measuring cycle (the preparation phase and the test phase being parts of such measuring cycle), from evacuation to testing to airing, Electronic measuring and control system, which is here made to function as a control unit 13, Power sources for individual components—valves, circuits, etc.

Fixtures and positioning members (which may include the feeding pipe 3, the fixture device 39 and the two plates 12, 14), which connect in particular the tested product, here the flexible bag 2, in the chamber CH of the enclosure 10.

Such testing system 1 is a complete system suitable for detecting a leak, here by simply continuously measuring helium partial pressure and analysis, by the analysis module 15 of the control unit 13, evolution over time of information representative of such helium partial pressure, so as to detect leaks in the outer wall W of the bag 2.

The test method uses so called tracer gas—helium, which is used to fill up the bag 2 placed in the chamber CH, while the internal volume 10*a* around/outside the bag 2 is connected to the detection assembly provided with the pressure measurement member 9.

If Helium quickly leaks out of the tested bag 2 into the detection area 10*d* where helium partial pressure is measured (and possibly displayed on a screen), no significant pressure drop PD can be identified by the analysis module 15, which means that detected helium is helium coming from the internal space SP via a hole in the bag 2. Indeed, permeability through the bag 2 (with a plastic wall W typically having a thickness greater than 150 or 200 micrometers) only allows escape of helium after a minimal time period, which may be superior to 4 seconds.

Referring to FIGS. 3-4 and 6, after time t0 that reflects moment of filling the bag 2 with helium (at step c/, the valve V1 being open to allow such filling), it can be seen that there is a pressure drop PD, while the minimal time period has not elapsed. Duration of the pressure drop PD is typically inferior to the minimal time period and may be considered as substantially constant. Indeed, for all the experiments, the start and the end of the pressure drop PD are substantially the same. Duration of the pressure drop PD is here about 2.5 or 2.6 seconds, not superior to 3 seconds, with the arrangement of the enclosure 10 and the kind of detection means used in the testing system 1.

During first seconds of test time, after helium injection in the bag 2, the flexible bag 2 inflates and accordingly compresses the remaining air in the vacuum chamber CH outside the bag 2 (i.e. the internal volume 10*a* decreases).

As a consequence, partial residual helium pressure in chamber CH increases for a short period of time before decreasing again, due to continuous evacuation. It is read by the mass spectrometer as a leak rate increase followed by a decrease, usually called pressure drop PD; whereas the bag 2 is perfectly tight. In FIG. 6, all the bags 2 under test are perfectly tight but there is no injection of helium in the internal volume 10*a*. It can be seen that it creates an artefact (bump) that reduces the segregation power by a factor 1000 for the leak detection. The leak rate curves 38 are exemplary curves (worst cases for bags 2 that should be identified as test compliant) reflecting a high deviation, causing high loss of the segregation power.

In several tests, when injecting helium by the second helium supplying device 6, it has been surprisingly found that curves 38 are practically not encountered (or less encountered), provided that suction has been efficiently performed after such specific injection (which means that period of time during which the mass spectrometer measures the helium remaining partial pressure in the vacuum chamber CH before the helium filling into the bag 2 is greater as compared to situation where no helium is specifically added in the internal volume 10*a*).

As a result, when having only curves with late increase after the pressure drop period elapses, such as curve 50 in FIG. 6 with late increase of the leak rate after the pressure drop PD or such as curve 50' in FIG. 6 with relatively quick increase of the leak rate after the pressure drop PD, the analysis module 15 may use a comparison with a preset reference result reflecting a no-leak state, for example a reference result similar to the case of curve 50'. Indeed, if a leak rate may be measured as low or lower than a suitable threshold, for instance $10^{-7}$ mbar·L/sec at about 3.5 seconds after t0 (or within a time slot around that moment), it may be efficiently concluded that the flexible bag 2 filled with helium has passed the integrity verification.

On FIGS. 3-4, step d/ corresponds to the period, starting at t0 or shortly after to, when a monitoring is performed on the basis of the measurements (at least the measurements made after t0), in order to analyze the pressure drop. The horizontal scale may be exaggerated at such step d/ to better illustrate the pressure drop PD. The step e/ shows that helium partial pressure usually increases after a while, after the end of the pressure drop PD for normal situation (see curve 50 in particular) where the bag 2 is leak-free.

Of course, the way the final leak rate value is calculated may vary. For instance, the analysis module 15 may firstly determine the turning-up point (down point) of the curve 50, 50' when the pressure drop PD elapsed and then estimate if the level of leak rate at such turning-up point is sufficiently low (below an acceptance criteria/threshold). If such turning-up point is not present or is found for a value higher that the acceptance threshold, it is concluded that the tested bag 2 has failed the test.

Advantageously, the acceptance threshold may optionally be lower than $2.00 \cdot 10^{-8}$ mbar·L·s$^{-1}$.

The above described method for verifying the integrity of the bag 2 comprises a preparation phase that may be longer than the test phase, especially due to time required for having low helium partial pressure before and after the injection 18.

In the preparation phase, a bag 2 as described and a system 1 as described are provided, as illustrated in FIG. 5. The bag 2 is empty (without any biopharmaceutical fluid) and may be initially flat. The enclosure 10 is provided with a single injection line 27 or similar connection that is part of the first helium supplying device 3, so that at time t0 it is then possible to send the pressurized gas, here helium, in order to inflate the flexible bag 2. Before t0, the second helium supplying device 6 is already used to perform injection 18, while the bag 2 is already in the enclosure 10 (the measuring cycle being started before the injection 18).

In some embodiments, the testing system 1 may include any suitable helium injection means, in order to implement a two-phase suction, namely:
- a first phase to reach a first (low) threshold for the helium leak rate as measured around the bag 2 under test (this first phase allowing a first removal of helium as adsorbed); and
- a second phase posterior to the new helium amount injection 18 to reach a second (low) threshold (or to reach a second time same threshold), so that remaining adsorbed helium and fresh helium are removed.

With such two-phase suction, the method advantageously reduces deviation effects for the background noise (background noise that could hide the leak to be detected), especially the background at the time of the pressure drop, following the filling step performed at the beginning in the test phase.

While the above detailed embodiments show use of a source of pressurized helium 4, which typically contains helium with usual purity suitable for medical use, the amount of helium injected around the flexible bag 2 could possibly be added using a different kind of source, possibly using a gas mixture or helium without same level of purity.

Helium is preferably used for many reasons. It is:
nontoxic,
inert and non-condensed,
usually not present in the atmosphere, only in trace amounts,
thanks to its low atomic mass it easily flows through even very small leaks,
non flammable.

The test method is appropriate for detecting a leak of micrometric and submicrometric size, even for high capacity bags 2. The enclosure 10 may be suitable to receive a bag having a capacity of at least 2 L, and possibly close to 500 or 650 L. In some embodiment the bag 2 has a capacity comprised between 20 and 50 L. In such cases, a single outer wall W may be provided to delimit the internal space SP that can be filled with the biopharmaceutical fluid.

Of course, the invention is not limited to the embodiments described above and provided only as examples. It encompasses the various modifications, alternative forms, and other variants conceivable to a skilled person within the context of the invention, and in particular any combinations of the various modes of operation described above, which may be taken separately or in combination.

In particular, a flexible bag 2 may comprise more than four plastic sheets for containing the biopharmaceutical fluid, possibly with each additional sheet increasing the integrity of the bag 2 to prevent any contamination of the biopharmaceutical fluid it contains.

The invention claimed is:

1. A testing system for verifying the integrity of a flexible bag, using a gas tracer, comprising:
    an enclosure delimiting a vacuum chamber in which an internal volume is fluid-tightly isolated from outside of the enclosure in an operating configuration of the enclosure;
    first helium supplying device provided with a feeding pipe for filling the flexible bag at a filling step with helium, via an outlet of the feeding pipe when the flexible bag is placed in the vacuum chamber so as to be surrounded by the internal volume;
    a vacuum suction assembly for performing vacuum suction and extracting gas from the internal volume outside the flexible bag, in a suction mode;
    at least one pressure measurement member for detecting helium partial pressure in a detection area of the internal volume, the detection area communicating with a suction inlet of the vacuum suction assembly;
    at least one source of pressurized helium intended to be introduced inside the flexible bag; wherein the testing system further comprises:
    a second helium supplying device for adding helium in the internal volume the flexible bag, the second helium supplying device comprising a feeding member that is:
        distinct from the feeding pipe,
        in fluid communication with a gas source;
    a control unit for controlling the first helium supplying device and the second helium supplying device, and adapted to trigger the second helium supplying device before the first helium supplying device; and
    an analysis module using to use information representative of helium partial pressure detected over time by the pressure measurement member before and after the filling step, the analysis module (15) being configured to detect a helium leak on the basis of said information.

2. The system according to claim 1, wherein the analysis module is adapted to use information representative of evolution over time of helium partial pressure detected by the pressure measurement member, after the filling step, in order to obtain a test result representative of a helium partial pressure drop in the detection area, the analysis module being configured to:
    use information representative of helium partial pressure detected by the pressure measurement member after an addition of helium by the second helium supplying device, for a period that includes a period subsequent to the filling step, when the vacuum suction assembly is in the suction mode;
    subtract a determined background value from raw measurement, after determining the determined background value on the basis of information representative of helium partial pressure detected by the pressure measurement member before the filling step, when the vacuum suction assembly is in the suction mode; and
    compare the test result to at least one reference result, so as to determine if the flexible bag filled with helium is considered to have or not to have passed the integrity verification.

3. The system according to claim 2, wherein the second helium supplying device comprises a valve, preferably a solenoid valve, upstream from the feeding member, the feeding member having a gas permeable wall to limit rate of helium added in the internal volume.

4. The system according to claim 2, wherein the control unit is configured to control:
    a first valve allowing circulation of helium in the feeding pipe in the filling step; and
    a second valve allowing circulation of helium in the feeding member.

5. The system according to claim 2, wherein the at least one source of pressurized helium is a helium source including a single tank outside the internal volume for containing all helium to be injected in the vacuum chamber, the single tank being operatively coupled to the first helium supplying device and to the second helium supplying device.

6. The system according to claim 1, wherein the second helium supplying device comprises a valve, preferably a solenoid valve, upstream from the feeding member, the feeding member having a gas permeable wall to limit rate of helium added in the internal volume.

7. The system according to claim 6, wherein the second helium supplying device comprises an additional valve, preferably a solenoid valve, downstream from the feeding member.

8. The system according to claim 6, wherein the gas permeable wall comprises a microporous and/or mesoporous membrane of silicone rubber or glass.

9. The system according to claim 1, wherein the control unit is configured to control:
   a first valve allowing circulation of helium in the feeding pipe in the filling step; and
   a second valve allowing circulation of helium in the feeding member.

10. The system according to claim 1, wherein the feeding member comprises a tube made of silicone or glass adapted to supply helium by diffusion through a silicone wall of the tube.

11. The system according to claim 1, wherein the at least one source of pressurized helium is a helium source including a single tank outside the internal volume for containing all helium to be injected in the vacuum chamber, the single tank being operatively coupled to the first helium supplying device and to the second helium supplying device.

12. The system according to claim 1, comprising:
   two plates that are in a spaced relationship, preferably parallel;
   a housing for receiving the flexible bag between the two plates, the plates forming constraining plates for constraining expansion of the flexible bag when filled with helium during filling step.

13. A test method using a tracer gas for verifying integrity of a flexible bag in order to detect existence of a possible hole, the test method comprising:
   in a preparation phase:
      providing a testing system comprising an enclosure that delimits a vacuum chamber adapted to be fluid-tightly isolated from outside of the enclosure in an operating configuration of the enclosure;
      providing an injection device suitable for delivery of a tracer gas in the vacuum chamber, the tracer gas being preferably helium;
      placing the flexible bag in the vacuum chamber and connecting a port of the bag to a feeding pipe in communication with a source of a tracer gas;
      performing vacuum suction, in order to obtain vacuum outside the flexible bag in an internal volume of the vacuum chamber-;
      performing a gas tracer injection by supplying an amount of tracer gas, by the injection device, in the internal volume outside the flexible bag; and
   in a test phase, while said vacuum suction is still performed:
      filling the flexible bag with an amount of the tracer gas at a filling step;
      detecting information representative of the partial pressure of the tracer gas outside the flexible bag in the internal volume, to allow detection of this tracer gas escaping from the flexible bag, by using at least one pressure measurement member;
      then, in a subsequent step, comparing a test result representative of a tracer gas partial pressure drop in the internal volume outside the flexible bag, which is obtained using the at least one pressure measurement member, to at least one reference result, so as to determine if the flexible bag is considered to have or not to have passed the integrity verification.

14. The test method according to claim 13, wherein in the test phase, comparison between the test result and the reference result is performed in a time slot comprised between 3 seconds and 10 seconds after starting the filling step.

15. The test method according to claim 13, wherein the tracer gas is helium, the test method further comprising in the preparation phase:
   performing vacuum suction inside the flexible bag to empty an internal space of the flexible bag;
   measuring the partial pressure of helium in a detection area of the internal volume;
   calculating a first time derivative of the partial pressure of helium in the detection area;
   wherein, when partial pressure of helium measured in the detection area reaches a trigger point, it is checked if first time derivative of partial pressure of helium is in a predetermined range, between a lower limit and an upper limit, and only if the first time derivative of partial pressure of helium is outside the predetermined range, said injection is performed by the injection device.

16. The test method according to claim 13, wherein the gas tracer is helium and wherein, in the preparation phase, the amount of helium is supplied in the internal volume (10a) outside the flexible bag (2) after a helium partial pressure has been measured in the internal volume (10a) as low as or below a predetermined threshold.

17. The test method according to claim 13, wherein the gas tracer is helium and wherein the reference result is:
   either a predefined pressure at a given time after start of the filling step, or
   or a predefined pressure drop threshold, obtained at a given time after start of the filling step by calculating a time derivative of a helium leak rate as detected by at least one pressure measurement member in a detection area of the internal volume.

18. The test method according to claim 13, wherein the filling step is performed in order to have the flexible bag maintained between two expansion-limiting plates spaced apart from and facing one another, suitable for not obstructing any leak in the wall of the flexible bag placed against them.

19. The test method according claim 13, wherein the flexible bag constitutes or is a part of a device under test intended to receive biopharmaceutical product and is provided with several flexible pipes each connected to a respective port of the device under test, the device under test being placed in the chamber before performing vacuum suction,
   and wherein, in the preparation phase, performing vacuum suction implies evacuating gas at different suction areas of the enclosure, in order to obtain vacuum inside the flexible bag and outside the flexible bag in the enclosure.

20. A testing system for verifying the integrity of a flexible bag, using a gas tracer, comprising:
   an enclosure delimiting a vacuum chamber in which an internal volume is fluid-tightly isolated from outside of the enclosure in an operating configuration of the enclosure;
   a first gas supplying device provided with a feeding pipe for filling the flexible bag at a filling step with gas, via an outlet of the feeding pipe when the flexible bag is placed in the vacuum chamber so as to be surrounded by the internal volume;

a vacuum suction assembly for performing vacuum suction and extracting gas from the internal volume outside the flexible bag, in a suction mode;

at least one pressure measurement member for detecting gas partial pressure in a detection area of the internal volume, the detection area communicating with a suction inlet of the vacuum suction assembly;

at least one source of pressurized gas to be introduced inside the flexible bag;

wherein the testing system further comprises:

a second gas supplying device for adding gas in the internal volume outside the flexible bag, the second gas supplying device comprising a feeding member that is:
 distinct from the feeding pipe;
 in fluid communication with a gas source; and a control unit for controlling the first gas supplying device and the second gas supplying device, and adapted to trigger the second gas supplying device before the first gas supplying device; and an analysis module to use information representative of evolution over time of gas partial pressure detected by the pressure measurement member before and after the filling step, the analysis module being configured to detect a gas leak on the basis of said information.

* * * * *

UNITED STATES PATENT AND TRADEMARK OFFICE
CERTIFICATE OF CORRECTION

PATENT NO. : 11,846,566 B2
APPLICATION NO. : 17/424959
DATED : December 19, 2023
INVENTOR(S) : Thenard et al.

Page 1 of 1

It is certified that error appears in the above-identified patent and that said Letters Patent is hereby corrected as shown below:

In the Claims

Column 22, Line 23: Claim 1, Delete "(15)"

Column 23, Line 50: Claim 13, Delete "chamber-;" and insert -- chamber; --

Signed and Sealed this
Twenty-seventh Day of August, 2024

Katherine Kelly Vidal
*Director of the United States Patent and Trademark Office*